United States Patent
Appleton

(10) Patent No.: US 8,213,617 B1
(45) Date of Patent: Jul. 3, 2012

(54) FINDING NEARBY USERS WITHOUT REVEALING OWN LOCATION

(75) Inventor: Benjamin C. Appleton, Summer Hill (AU)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/302,599

(22) Filed: Nov. 22, 2011

(51) Int. Cl.
- *H04L 29/06* (2006.01)
- *H04K 1/00* (2006.01)
- *H04M 1/66* (2006.01)
- *H04M 1/68* (2006.01)
- *H04M 3/16* (2006.01)
- *H04W 24/00* (2009.01)

(52) U.S. Cl. ..... 380/270; 380/255; 455/411; 455/414.2; 455/456.2; 455/456.3

(58) Field of Classification Search .......... None
See application file for complete search history.

(56) References Cited

U.S. PATENT DOCUMENTS

| | | | |
|---|---|---|---|
| 5,831,576 A * | 11/1998 | Sheynblat | 342/357.64 |
| 7,088,989 B2 * | 8/2006 | Guo | 455/411 |
| 7,199,726 B2 * | 4/2007 | Fomukong | 340/988 |
| 7,239,878 B2 * | 7/2007 | Bazin et al. | 455/456.3 |
| 7,561,888 B2 * | 7/2009 | Jennings | 455/456.2 |
| 7,590,245 B1 * | 9/2009 | Levitan | 380/255 |
| 7,613,426 B2 * | 11/2009 | Kuehnel et al. | 455/41.2 |
| 7,840,227 B2 * | 11/2010 | Kahlert et al. | 455/456.2 |
| 7,925,027 B2 | 4/2011 | Kempf et al. | |
| 8,010,131 B2 * | 8/2011 | Rothschild | 455/456.3 |
| 8,099,086 B2 * | 1/2012 | Singh et al. | 455/414.2 |
| 2011/0110525 A1 | 5/2011 | Gentry | |
| 2011/0142016 A1 * | 6/2011 | Chatterjee | 370/338 |

OTHER PUBLICATIONS

Mobile Nations, "iPhone Patent Applications Reveal Better Find My iPhone, Social Matching, and a Way to Stop Users from Recording Concerts(?!) [Patent Roundup}," TiPb (2011). Retrieved from the Internet on Nov. 30, 2011: URL:http://www.tipb.com/2011/06/16/iphone-patent-applications-reveal-find-iphone-social-matching-patent-roundup/.

Technology Review, "Anonymous Tracking," Published by MIT (2011). Retrieved from Internet on Nov. 30, 2011: URL:http://www.technologyreview.com/web/37800/.

(Continued)

*Primary Examiner* — Shin-Hon Chen
(74) *Attorney, Agent, or Firm* — Marshall, Gerstein & Borun LLP

(57) ABSTRACT

A method can be implemented in a portable device operating in a wireless communication network. The method is for securely reporting an indication of a current geographic location of the portable device to a server without revealing the current geographic location of the portable device to the server, where the server is communicatively coupled to the communication network. The method includes generating a pseudo-random value using a signal from an environment in which the portable device operates, generating a location descriptor based on the current geographic location of the portable device, applying a cryptographic function to a combination of the pseudo-random value and the location descriptor to generate a secure location indicator for the portable device, and causing the secure location indicator to be electronically transmitted to the server via the communication network.

30 Claims, 7 Drawing Sheets

OTHER PUBLICATIONS

Technology Review, "Homomorphic Encryption," Published by MIT (2011). Retrieved from the Internet on Nov. 30, 2011: URL:http://www.technologyreview.com/computing/37197/.

Wikipedia, "One-Time Pad," (2011). Retrieved from the Internet on Dec. 2, 2011: URL:http://en.wikipedia.org/wiki/One-time_pad.

Wikipedia, "HMAC," (2011). Retrieved from the Internet Dec. 2, 2011: URL:http://en.wikipedia.org/wiki/HMAC.

Wikipedia, "Global Positiong System," (2011). Retrieved from the Internet Dec. 2, 2011: URL:http://en.wikipedia.org/wiki/Global_Positioning_System.

Wikipedia, "Consisten Hashing," (2011). Retrieved from the Internet Dec. 2, 2011: URL:http://en.wikipedia.org/wiki/Consistent_hashing.

Wikipedia, "Random Seed," (2011). Retrieved from the Internet Dec. 2, 2011: URL:http:en.wikipedia.org/wiki/Random_seed.

Wikipedia, "Hardware Random Number Generator," (2011). Retrieved from the Internet Dec. 2, 2011: URL:http//en.wikipedia.org/wiki/Hardware_random_number_generator.

* cited by examiner

FINDING NEARBY USERS WITHOUT REVEALING OWN LOCATION

FIELD OF THE DISCLOSURE

The present disclosure relates to location-based services and, more specifically, to notifying a user of a portable devices when other users of portable devices are nearby without compromising privacy of the users.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Many portable communication device sold today, such as a smartphones or tablet personal computers (PCs), are capable of determining their location. For example, a portable communication device can be equipped with a Global Positioning System (GPS) chip to determine the latitude, longitude, and elevation of the device based on signals from several GPS satellites. Some devices also can determine their location using signals from "hotspots" such as Wi-Fi access points. Other positioning techniques available today include proximity sensing using radio-frequency identification (RFID), triangulation using radio signals from fixed cellular infrastructure elements, etc.

Manufacturers of portable communication device devices, as well as various software developers, have created numerous software applications that utilize location data for navigation, searching, social networking, gaming, etc. For example, some applications allow users to automatically report their location to a network server and share their locations with friends and family. As the market for these and other location-based applications and services continues to grow, so does the concern with reliability, accuracy, and privacy of such applications and services.

SUMMARY

A method according to one embodiment is in a portable device operating in a wireless communication network. The method is for securely reporting an indication of a current geographic location of the portable device to a server without revealing the current geographic location of the portable device to the server, where the server is communicatively coupled to the communication network. The method includes generating a pseudo-random value using a signal from an environment in which the portable device operates, generating a location descriptor based on the current geographic location of the portable device, applying a cryptographic function to a combination of the pseudo-random value and the location descriptor to generate a secure location indicator for the portable device, and causing the secure location indicator to be electronically transmitted to the server via the communication network.

A method according to another embodiment is implemented in a portable device operating in a wireless communication network. The method is for securely reporting an indication of a current geographic location of the portable device to a server without revealing the current geographic location of the portable device to the server, where the server is communicatively coupled to the communication network. The method includes deriving a plurality of one-time pads (OTPs) from environmental entropy, determining the current geographic location of the portable device, generating a plurality of location descriptors based on the current geographic location of the portable device, where each of the plurality of location descriptors specifies a respective geographic area encompassing, or being proximate to, the current geographic location of the portable device, hashing every combination of one of the plurality of OTPs with one of the plurality of location descriptors to generate a plurality of secure location indicators, and providing the plurality of secure location indicators and an identifier of the portable device to the server via the communication network.

In yet another embodiment, a portable device includes one or more processors, a communication module coupled to the one or more processors and configured to transmit and receive signals via a wireless communication network, and a computer-readable memory coupled to the one or more processors and storing instructions thereon. When executed by the one or more processors, the instructions cause the portable device to generate a plurality of one-time pads (OTPs) using a signal from an environment in which the portable device operates, where the signal is received via the communication module; generate a plurality of location descriptors based on a current geographic location of the portable device, where each of the plurality of location descriptors specifies a respective geographic area associated with the current geographic location of the portable device; generate a plurality of secure location indicators using a cryptographic function, the plurality of OTPs, and the plurality of location descriptors; and provide the plurality of secure location indicators via the communication module to a server operating on the wireless communication network for determining one or more devices physically proximate to the portable device using the plurality of secure location descriptors.

A method of another embodiment is implemented in a server communicatively coupled to a wireless communication network, in which a first portable device and a second portable device operate. The method includes electronically receiving, at the server, a first secure location indicator from the first portable computing device, where the first secure location indicator was generated using a location of the first portable computing device, and where the first secure location indicator does not reveal the location of the first portable computing device to the server. The method also includes electronically receiving, at the server, a second secure location indicator from the second portable computing device, where the second secure location indicator was generated using a location of the second portable computing device, and where the second secure location indicator does not reveal the location of the second portable computing device to the server. Further, the method includes comparing the first secure location indicator to the second secure location indicator and, in response to determining that the first secure location indicator is identical to the second secure location indicator, causing an indication of physical proximity of the second portable computing device to be electronically transmitted to the first portable computing device.

DETAILED DESCRIPTION

Using the techniques described below, a portable device operating in a wireless communication network provides a secure indication of its geographic location to a server so as to allow the server to identify devices that are physically proximate to the portable device, yet prevent the server from determining the geographic location of the portable device. In an example implementation, the portable device generates such an indication (hereinafter, a "secure location indicator") by applying a cryptographic function to a combination of quantized geographic coordinates and a pseudo-random noise sequence derived from environmental entropy. Another device can generate the same secure location indicator upon generating the same quantized geographic coordinates and deriving the same pseudo-random noise sequence from the environment. The other device is highly unlikely to do so unless located relatively close to the portable device. The server can receive and compare secure location indicators from several portable devices and, upon identifying a pair of secure location indicators that are identical, determine that the corresponding portable devices are physically proximate to each other. The server can then generate an appropriate notification for one or both portable devices. For example, the user of the portable device may see a pop-up notification on the screen that tells the user that his or her friend is nearby. However, neither the server nor a third party can determine to which geographic location a secure location indicator corresponds. More specifically, no entity that receives the secure location indicator can determine the geographic coordinates of the portable device. Thus, conveying the secure location indication from the portable device to the server does not compromise privacy of the user of the portable device, even if the secure location indication is intercepted or otherwise obtained without permission or authorization.

Figure 1:
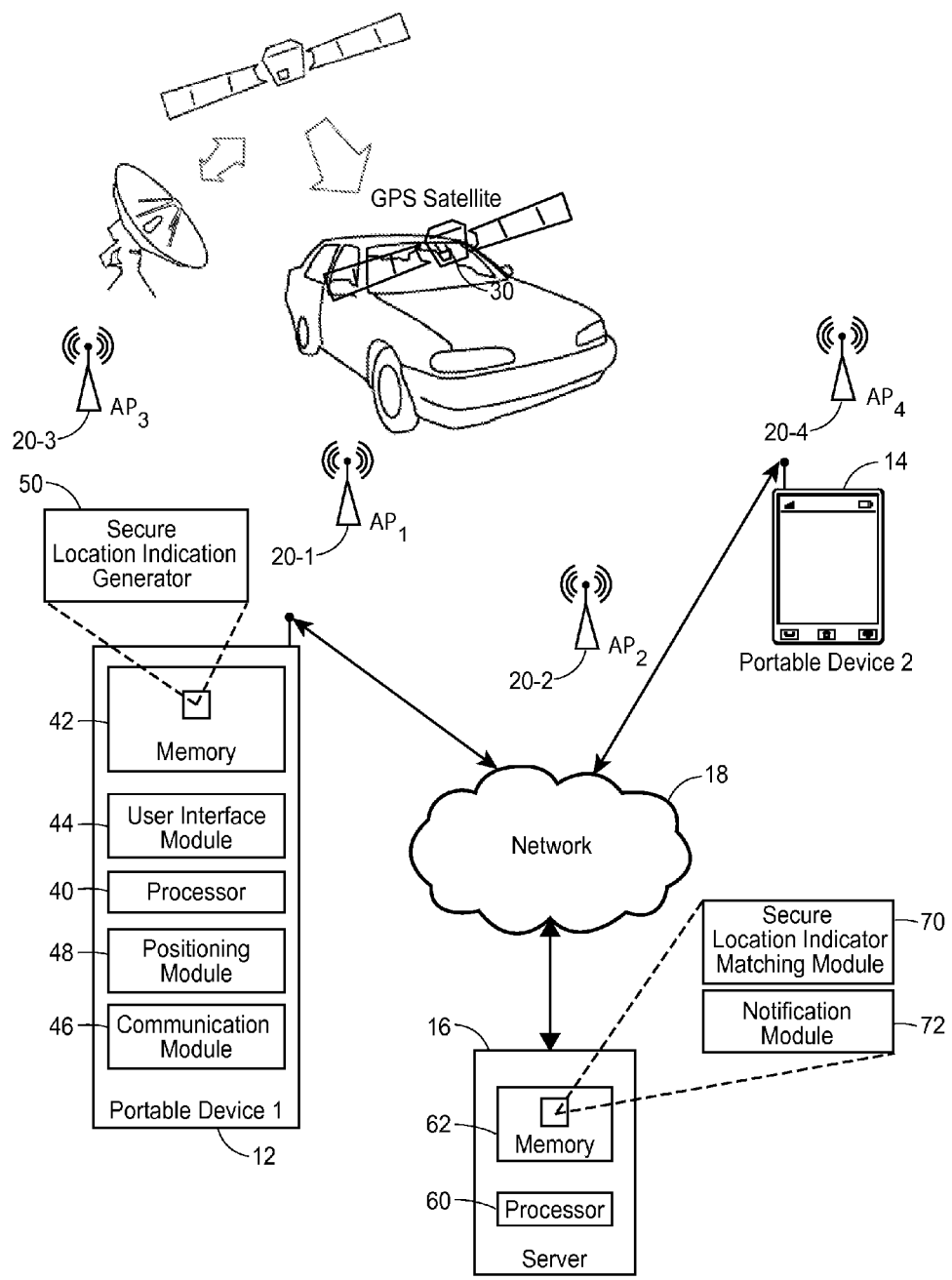
FIG. 1 is a block diagram of an example communication system in which users of portable devices, who are located near each other, generate secure location indicators to identify each other without revealing their respective locations to another party.

Example techniques for generating, communicating, and processing secure location indicators are discussed in more detail with reference to FIGS. 1-9B. Referring first to FIG. 1, an example communication system 10 includes a portable device 12, a portable device 14, and a server 16 that can communicate with the portable devices 12 and 14 via a wireless communication network 18. For example, the wireless communication network 18 may be a cellular third generation (3G) network that allows subscriber devices to make voice calls, video calls, exchange data packets at high data rates to support various applications, etc. Several wireless access points (APs) 20 operate in the vicinity of the portable devices 12 and 14. In the example configuration depicted in FIG. 1, the portable device 12 may receive signals from an AP 20-1, an AP 20-2, and an AP 20-3, while the portable device 14 may receive signals from the AP 20-1, the AP 20-2, and an AP 20-4. Further, the portable devices 12 and 14 can determine their respective geographic locations using signals from GPS satellites such as a satellite 30. Although a device generally requires signals from multiple GPS satellites to determine its geographic location, only one such satellite is depicted in FIG. 1 for ease of illustration.

The portable devices 12 and 14 in general may be smartphones, laptop computers, tablet personal computers (PCs), or any other suitable types of devices. In an example implementation, the portable device 12 includes one or more processors 40 to execute software instructions, one or more memories 42 to store software instructions and data, a user interface module 44 to receive user input and provide output to a user, one or more communication modules 46 to transmit and receive data via the communication network 18 according to one or more communication protocols, and a positioning module 48 to automatically determine the geographic location of the portable device 12. The components 40-48 can be interconnected in any suitable manner (e.g., via a digital bus). The portable device 14 may include same or similar components. Further, depending on the implementation, the portable device 12 and 14 may also include additional components, such as speakers and cameras, for example.

The memory 42 may be a persistent memory such as a hard disk or flash memory. More generally, the memory 42 may include any suitable computer-readable medium. In addition to persistent memory, the portable device 12 may include non-persistent, or volatile memory such as RAM (not shown) that may be provided on the same chip as the processor 40. The memory 42 may store instructions that, when executed by the processor 40, provide various functionality to the user of the portable device 12. More specifically, the memory 42 may store the instructions of an operating system (e.g., Android™, iOS™, Symbian™), various telephony services, applications, etc. The memory 42 also may store instructions of a secure location indicator 50, which may be implemented as an application downloadable to the portable device 12 from a network server, as a service of the operating system, or in any other suitable manner.

The modules 44, 46, and 48 may be implemented using any suitable hardware and/or software components. Further, some of the modules 44, 46, and 48 may be combinations of components or, conversely, portions of larger components. For example, the user interface module 44 may be a touchscreen or, alternatively, may include an input device (e.g., a keyboard) and a separate output device (e.g., a screen). The communication module 46 may include hardware, firmware, and software components to enable the portable device to communicate on a cellular communication network in accordance with one or more telecommunication standards or protocols. Further, the communication module 46 may support communications on a wireless location area network (WLAN) conforming to an Institute of Electrical and Electronics Engineers (IEEE) 802.11 standard, for example. Still further, the communication module 46 may support short-range wireless communications such as those that conform to the Bluetooth™ standard. The positioning module 48 may be provided in the form of a GPS receiver chip, for example. However, in another implementation, the positioning module 48 and the communication module 46 may be provided as an integral component. As a more specific example, the positioning module 48 may determine the geographic location of the portable device 12 using signals received from one or several APs 20.

With continued reference to FIG. 1, the server 16 may include one or more processors 60 and a computer-readable memory 62 storing instructions that execute on the processor 60. In particular, the memory 62 stores instructions of a secure location indication matching module 70 and a notification module 72. As discussed in more detail below, the modules 70 and 72 may be configured to receive and process respective secure location indicators generated by the portable device 12, the portable device 14, and other portable devices that operate in the communication system 10. The server 16 can be coupled to the network 18 in a wired or wireless manner.

In operation, the portable device 12 generates secure location indicators using the environmental entropy and an indication of the geographic location of the portable device 12. In particular, the portable device 12 receives signals from the environmental entropy via the communication module 46, and the secure location indication generator 50 generates sequences of pseudo-random data using the received signals. As one example, the portable device 12 may receive data packets from the APs 20-1, 20-2, and AP 20-3 during a certain time interval (e.g., one minute) and apply a secure hash function to the received data packets to generate a stream of pseudo-random values. The secure location indication generator 50 then may select one or several pseudo-random values as one-time pads (OTPs). The server 16 has no access to an OTP derived from environmental entropy, and thus an N-bit long OTP contributes N bits of entropy to a secure location indicator.

The positioning module 48 may determine the geographic location of the portable device 12 and provide latitude and longitude values, for example, to the secure location indication generator 50. In response, the secure location indication generator 50 may quantize the latitude and longitude values to generate a location descriptor that specifies a certain area, such as a square region 50 feet wide, in which the portable device 12 is located. In one implementation, the secure location indication generator 50 generates several such location descriptors, each of which specifies a respective area either encompassing or being proximate to the geographic location of the portable device 12. In another implementation of the portable device 12, the positioning module 48 generates a location descriptor that specifies the location of the portable device 12 only approximately, and the secure location indication generator 50 uses the location descriptor as an already quantized location descriptor.

Using the one or more OTPs and the one or more latitude and longitude values, the secure location indication generator 50 generates one or more secure location indicators that depend on the current geographic location of the portable device 12 and the current environment in which the portable device 12 operates, but do not divulge the geographic location of the portable device 12 to a recipient. To this end, the secure location indication generator 50 may apply a cryptographic function, such as a secure hash function, to a combination of one of the OTPs and one of the location descriptors. In one implementation, the secure location indication generator 50 applies the secure hash function to every combination of N OTPs and M location descriptors to generate N*M secure location indicators. Secure location indicators generated using a hash function can be referred to as "private location hashes." It is noted, however, that secure location indicators also can be generated using functions other than hash functions, such as encryption functions that are not based on hashing.

The portable device 12 provides the one or several secure location indicators to the server 16, in which the secure location indicator matching module 70 compares these indicators to secure location indicators received from other portable devices during the same time interval or during one or several recent time intervals. If a pair of portable devices reported the same secure location indicator, the server 16 determines that the portable devices are currently located near each other. The notification module 72 accordingly generates a notification and, depending on user-specified settings, provides the notification to one or both portable devices 12 and 14.

In turn, the portable devices 12 and 14 can provide appropriate visual and/or audio indications to the respective users. For example, the portable devices 12 and 14 may support a social networking software application that allows users to "track" their friends and family (who preferably have consented to being tracked), as well as manually or automatically provide secure indications of their own location to the server 16, so that their friends and family in turn can track them. In one such scenario, the user of the portable device 12 visits a crowded location, such as a concert venue, and configures her profile and/or the portable device 12 to actively notify the user when her friends appear within a certain distance of the user, such as 150 feet. The user of the portable device 14 may similarly configure his profile and/or the portable device 14. Once the server 16 forwards to the portable device 12 a notification that the portable device 14 is nearby, the social networking application may display a pop-up window with the text "Bob is here. Stand up and wave!" or any other suitable text, which may be user-configurable.

Further, in some implementations, users of the portable devices 12 and 14 can configure the social networking application to provide a particular message to the server 16, so that the server 16 can forward the message to portable devices that are identified as being proximate. For example, the user of the portable device 14 can type in the text "Look for the guy in the green shirt and tan slacks" and instruct the social networking application to transmit this text to the server 16 along with a set of secure location indicators and the identifier of the portable device 14. In this manner, the user's friends can automatically receive a location-specific message from the user when the server 16 determines that the user and his friends are within a certain small distance of each other.

To better illustrate the techniques of the present disclosure, an example system 100 for generating secure location indicators is discussed next with reference to FIG. 2. The system 100 may operate in any suitable device, such as the portable device 12 or the portable device 14 of FIG. 1, for example. When implemented in the portable device 12, some or all of components of the system 100 may operate as the secure location generator 50.

In one embodiment, the system 100 includes an OTP module 102 that generates one or more OTPs using a signal received from the environment, a location quantizer 104 to generate one or several quantized representations of a geographic location, and a hash value generator 106 to generate or more private location hash values, which a portable device that implements the system 100 may utilize as secure location indicators. The modules 102, 104, and 106 may be implemented as sets of software instructions that are stored on a tangible computer-readable medium and are executable on a processor. Alternatively, the modules 102, 104, and 106 may be implemented in firmware, hardware, or any suitable combination of hardware, firmware, and software.

The OTP module 102 includes a set of L secure hash modules 110-1, 110-2, 110-3, . . . 110-L. In an example implementation, the value of L is selected so to achieve an at least 99% probability that two portable devices generate the same OTP based on the same signal from the environment, as explained in more detail below. The number of secure hash modules 110 in general can be one or more (i.e., $L \geq 1$). Each of the secure hash modules 110 can operate as a Hash-based Message Authentication Code (HMAC) generator and implement a secure hash function $SH_i$. For example, each of the secure functions $SH_1$, $SH_2$ . . . $SH_L$ may be the Secure Hash Algorithm 512 (SHA-512) function used with a different key. As a more specific example, for a data packet P, the secure hash module 110-1 may output the first 128 bits of the result of applying the SHA-512 function to the data packet P using key $K_1$, the secure hash module 110-2 may output the first 128 bits of the result of applying the SHA-512 function to the data packet P using key $K_2$, etc. However, the secure hash modules 110 need not necessarily implement same or even similar functions. For example, the secure hash module 110-1 may implement the SHA-512 function, while the secure hash module 110-2 may implement the Message Digest Algorithm 5 (MD5) function.

The OTP module 102 in various implementations and/or scenarios may operate on Wi-Fi signals, Bluetooth signals, other suitable radio signals, acoustic signals, etc. The signal may include a stream of digital data or discrete data packets, for example. As another alternative, the signal may include analog data which the OTP module 102 could sample to generate a sequence of digital values to be applied to the secure hash generators 110. In the example of FIG. 2, the OTP module 102 operating in a portable device receives data packets via a Wi-Fi communication channel 120 (or a set of channels) from all APs operating within range of the portable device. It is noted that the portable device need not operate in a network associated with an AP from which a data packet is received. Further, the data packet may be encoded or non-encoded, and may be transmitted from the AP for any purpose (e.g., as a beacon, as a frame carrying data to a certain station, etc.). Referring back to FIG. 1, for example, the OTP module 102 operating in the portable device 12 may receive data packets from the APs 20-1, 20-2, and 20-3.

Figure 2:
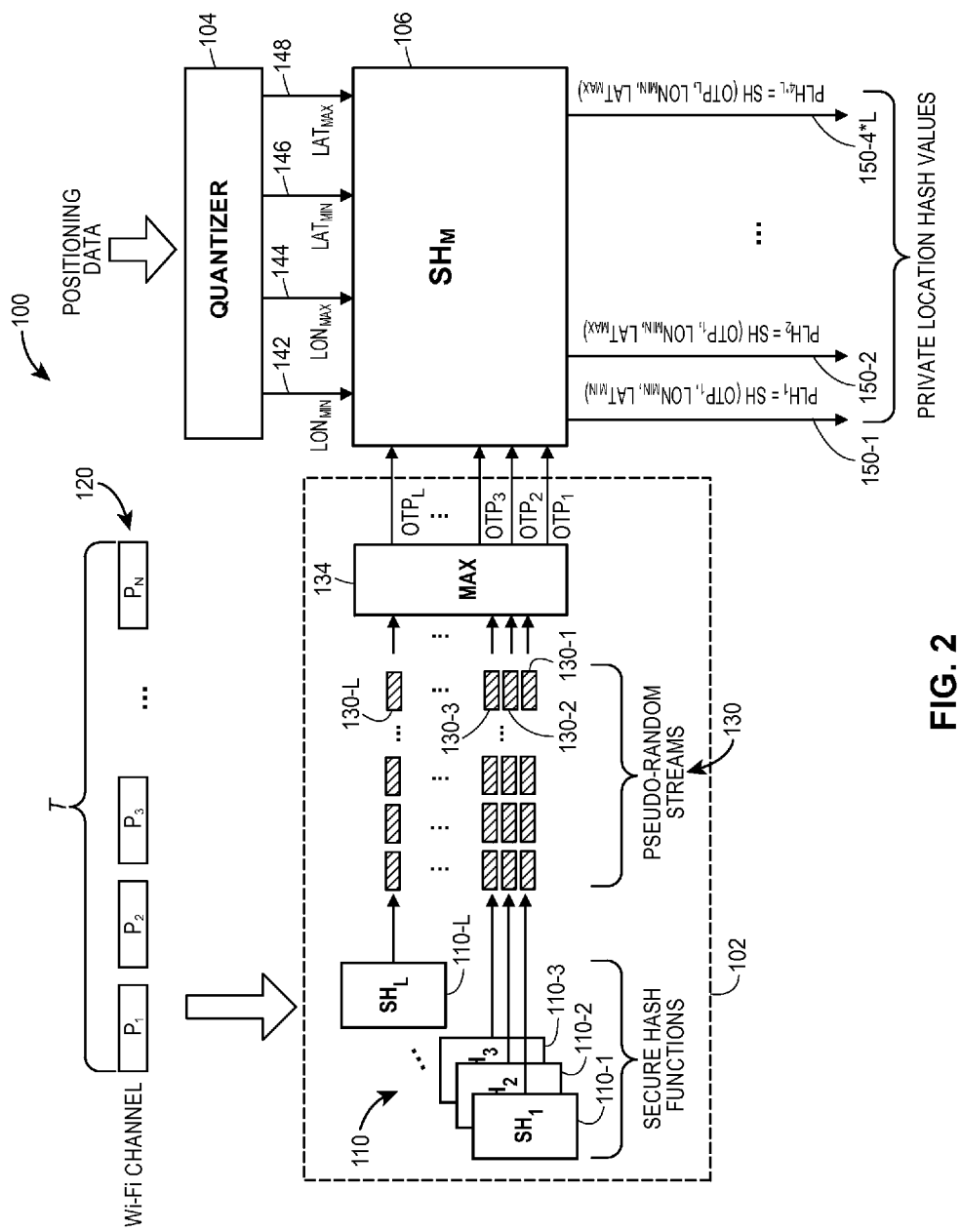
FIG. 2 is a block diagram of an example system for generating secure location indicators in the form of private location hash values, that can be implemented in the portable devices of FIG. 1.

With continued reference to FIG. 2, the secure hash modules 110 may generate L streams 130-1, 130-2, 130-3, . . . 130-L of pseudo-random values, such as 128-bit hashes. Once per time interval of length T (e.g., one minute), a selector 134 may select the largest value from each of the L streams 130 to generate a set of OTPs including $OTP_1$, $OTP_2$, . . . $OTP_L$. In other implementations, the selector 134 may select values according to another principle, such as by selecting the smallest value from each of the streams 130. In the example implementation of FIG. 2, the OTP module 102 then supplies the set of OTPs to the hash value generator 106.

The quantizer 104 supplies other inputs to the hash value generator 106. In general, the quantizer 104 may receive positioning data, such as GPS coordinates of the portable device in which the system 100 operates, and quantize the positioning data to generate a set of M location descriptors. Each location descriptor may specify a different area either encompassing or being proximate to the location specified by the positioning data. For example, the latitude and the longitude of a portable device may be quantized to the nearest 50 feet and 100 feet to specify four 50-feet-wide square regions. As a more specific example, current GPS coordinates of a portable device may correspond to a point with the latitude of approximately 345 feet and the longitude of approximately 890 feet relative to a common origin. The quantizer 104 may generate location descriptors with coordinate tuples (300, 850), (300, 900), (350, 850), and (350, 900), each of which specifies the upper left corner of the corresponding square region. Alternatively, each tuple may specify the actual GPS coordinates that have been quantized to a nearest 50- or 100-foot point. In general, a region can have any desired shape (e.g., a circle), can be specified in any suitable manner (by specifying one or several vertices, by specifying the geometric center, etc.), and can be selected using any desired scale of quantization.

In the implementation of FIG. 2, the location quantizer 104 generates a minimum longitude value 142, a maximum longitude value 144, a minimum latitude value 146, and a maximum latitude value 148 that may be used to generate four location descriptors, each corresponding to one of the tuples ($LAT_{MIN}$, $LON_{MIN}$), ($LAT_{MIN}$, $LON_{MAX}$), ($LAT_{MAX}$, $LON_{MIN}$), or ($LAT_{MAX}$, $LON_{MAX}$). In the example scenario discussed above, $LAT_{MIN}$=300, $LAT_{MAX}$=350, $LON_{MIN}$=850, and $LON_{MIN}$=900. Using the four values 142-148 and the L OTP values generated by the OTP module 102, the hash value generator 106 may generate 4*L secure location indicators 150-1, 150-2, . . . 150-4*L. To generate the secure location indicators 150, the hash value generator 106 may apply a main secure hash function ($SH_M$), such as SHA-512, to each combination of an OTP and a location descriptor: ($OTP_1$, $LAT_{MIN}$, $LON_{MIN}$), ($OTP_1$, $LAT_{MIN}$, $LON_{MAX}$), . . . ($OTP_L$, $LAT_{MAX}$, $LON_{MAX}$). The function $SH_M$ may be the same as one or several of the functions $SH_1$, $SH_2$ . . . $SH_L$, or may be a different hash function.

Several example methods for generating, exchanging, and processing secure location indicators in the communication system 10 (or a similar system) are discussed next with reference to several flow diagrams in FIGS. 3-7. The methods illustrated in these flow diagrams may be implemented as software instructions stored on a tangible computer-readable medium and executable one or more processors. It is noted, however, that these methods also can be implemented, at least partially, in firmware, hardware, or as a suitable combination of hardware, firmware, and software.

Figure 3:
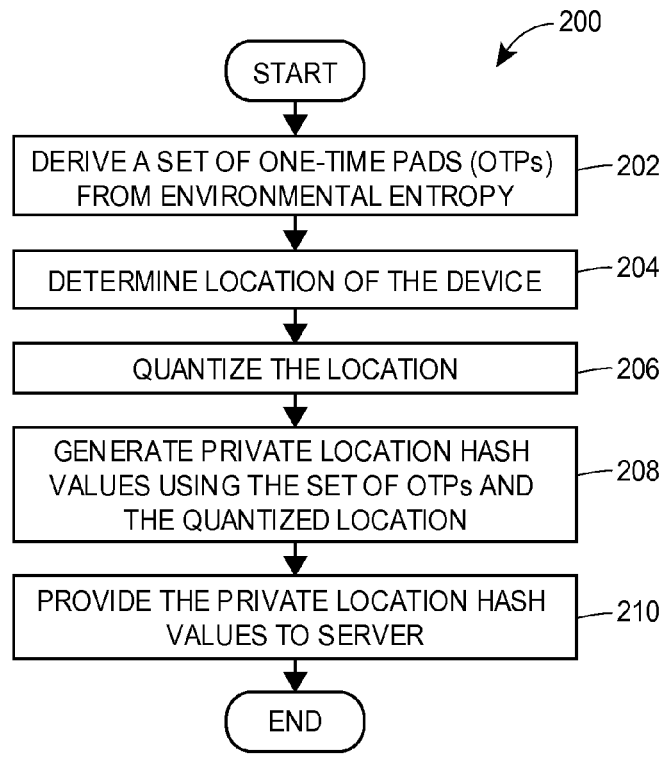
FIG. 3 is a flow diagram of an example method for generating private location hash values that can be implemented in a portable device of FIG. 1.

FIG. 3 illustrates an example method 200 for generating private location hash values that can be implemented in the secure location indication generator 50 of FIG. 1 or the system 100 of FIG. 2, for example. The method 200 begins at block 202, when a set of one or several OTPs are derived from environmental entropy. It is noted that the techniques of the present disclosures do not require that multiple OTPs be generated or provided to a server, but, by generating multiple OTPs, a portable device can increase the probability that a server promptly identifies a proximate portable device. It is also noted that although the OTPs in the examples discussed above are generated using Wi-Fi data packets, the OTPs in general can be derived from any suitable source that approximated an unpredictable process with sufficient entropy. Thus, the OTPs can be obtained at block 202 based on any environmental factor that can be represented as a signal and can be observed in a similar manner by two proximate devices (e.g., a sound, a temperature measurement, a visual signal).

Next, at block 204, the location of the device is determined using GPS positioning, Wi-Fi triangulation, proximity sensing with Bluetooth or infrared (IR) signals, etc. The location is then quantized at block 206 to generate a location descriptor. Although the location can be quantized to a single area, such as a square or circular region with an area of approximately 2,500 square feet, multiple quantized location descriptors can be generated to improve the accuracy of locating proximate device. According to an example implementation, the geographic coordinates determined at block 204 are quantized to four adjacent square regions, as discussed below with reference to FIGS. 9A and 9B. On the other hand, in another implementation, the location determined at block 204 specifies a region or an area rather than a particular point, so that the coordinates can be used as an already quantized location descriptor. In this case, the location descriptor is merely transformed to a suitable format at block 206, if necessary.

At block 208, private location hash values are generated using the OTPs and the one or more location descriptors generated at block 206. For example, a secure hash function may be applied to a combination of a location indicator, a quantized latitude, and a quantized longitude. More specifically, some or all of the bits of the location indicator may be appended to some or all of the bits of the quantized latitude and some or all of the bits of the quantized longitude. In one implementation, the SHA-512 function may be applied to the combination, and the first 128 bits of the output may be used as private location hash value. Additional private location hashes may be generated at block 208 if multiple OTPs and/or multiple quantized location indicators are generated earlier at blocks 202 and 206.

The one or several private location hashes are then provided to a server at block 210 via a wireless network link, for example. The method completes after block 210. However, in at least some implementations, the method 200 is then executed again following a certain time interval (e.g., a minute). The method 200 in general can be invoked at regular intervals or in response to particular events such as movement of the portable device in which the method 200 is implemented.

Figure 4:
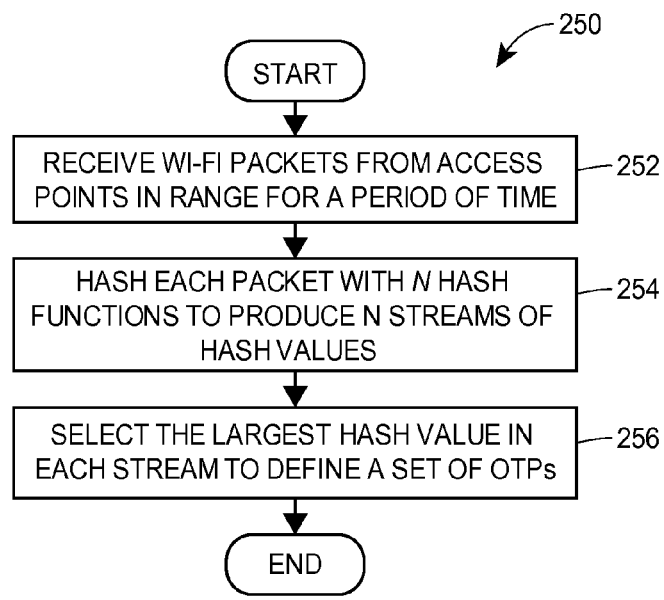
FIG. 4 is a flow diagram of an example method for generating one-time pads (OTPs) that can be used to generate private location hash values in a portable device of FIG. 1.

Referring to FIG. 4, a method 250 for generating OTPs can be executed at block 202 of the method 200, for example. The method 250 can be implemented in a portable device such the portable device 12 of FIG. 1 or, more specifically, in an OTP generator operating in such a device, such as the OTP generator 102 of FIG. 2.

The method 250 begins at block 252, when Wi-Fi data packets are received from one or more APs operating in range of the portable device. The Wi-Fi data packets may be received during a regularly repeating period of time, such as during the first 20 seconds of each minute, or during the entire 60 seconds of each minute. The received Wi-Fi data packets may be beacons or any other data packet, and can be encoded or not encoded, as discussed above. It can be expected that two portable devices operating within a certain range of each other observe a substantial overlap in Wi-Fi data packets collected during the time period, possibly even seeing a 100% overlap in the data packets at certain times.

At block 254, each of the received data packets is hashed using N different hash functions, which may be cryptographic hash functions similar to those implemented by the secure hash modules 110 of FIG. 2, for example. Thus, each data packet is transformed into N hash values, which can be regarded as pseudo-random values, and the set of data packets received at block 252 is transformed into N streams of pseudo-random data. The length of each hash value is 128 bits, according to one example embodiment of the method 250. Although N=1 in one implementation of the method 250, a larger value of N can be selected to improve the probability that two portable devices ultimately produce the same secure location indicator. Possible effects of the value of N on the accuracy of detecting proximate devices are discussed in more detail below with reference to FIG. 8.

Next, at block 256, the largest hash value in each of the N streams is selected. For example, each hash value can be interpreted as a binary coded decimal. In general, a hash value can be selected from one of the N streams according to any principle that can be applied uniformly at multiple portable devices that participate in submitting secure location indicators to a common server or group of servers. Thus, in another implementation of the method 250, the smallest hash value can be selected at block 256. It is noted that because two or more portable devices sometimes may see overlap in Wi-Fi data packets that is greater than zero but less than 100%, the hash values selected at block 256 may be generated using different data packets.

Figure 5:
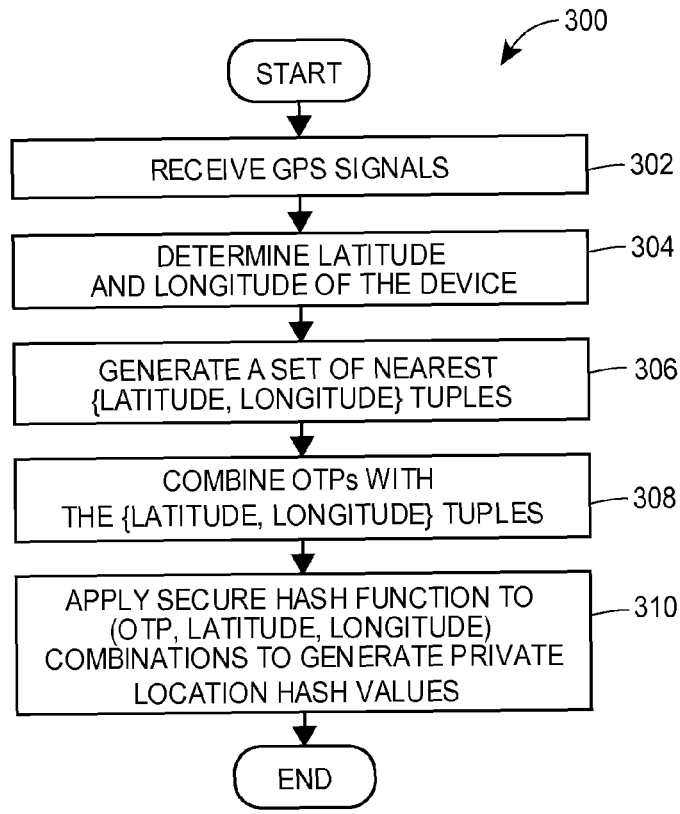
FIG. 5 is a flow diagram of an example method for generating private location hash values using OTPs and latitude/longitude tuples, that can be implemented in a portable device of FIG. 1.

As an example of using GPS data with a set of one or more OTPs to generate secure location indicators, FIG. 5 illustrates a method 300 for generating private location hash values that, similar to the method 200 of FIG. 3, can be implemented in the secure location indication generator 50 of FIG. 1 or the system 100 of FIG. 2. In one embodiment of the system 100, for example, the method 250 is invoked to generate a set of OTPs, and the method 300 is then invoked to use these OTPs with quantized location indicators to generate secure location indicators. More generally, the method 300 can be implemented in any suitable device that operates in the system of FIG. 1 or a similar environment.

At block 302, GPS signals are received and processed. The latitude and the longitude of the portable device are then determined at block 304. Next, at block 306, a set of location descriptors can be generated in the form of tuples that specify quantized latitude and longitude values. In an example implementation, the quantized latitude and longitude can be the GPS latitude and longitude coordinates approximated to the nearest 50 or 100-foot value. Various combinations OTPs and the location descriptors are then generated at block 308, and a secure hash function is applied to each combination at block 310: $(OTP_1, LAT_1, LON_1)$, $(OTP_1, LAT_1, LON_2)$, etc.

As indicated above, a portable device can provide secure location indicators to a server at regular intervals to ensure that, as the portable devices moves about, the server can check new pairs or groups of physically proximate devices can be identified. To this end, the portable device can implement, for example, a method 350 of FIG. 6 for generating private location hash values using periodically collected signal from the environment.

Figure 6:
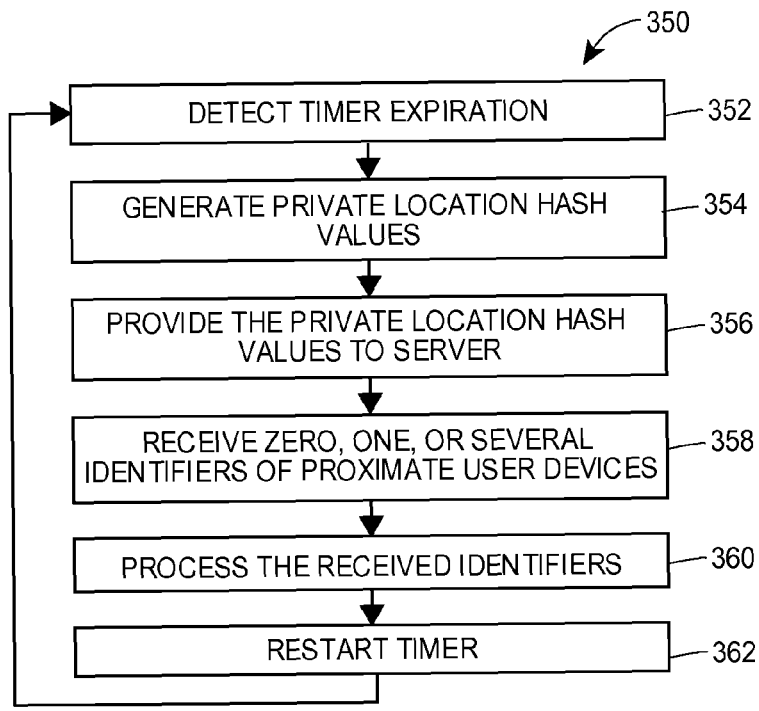
FIG. 6 is a flow diagram of an example method for generating private location hash values using periodically collected signal from the environment, that can be implemented in a portable device of FIG. 1.

Referring to FIG. 6, the method 350 begins at block 352 upon expiration of a timer, which may be configured to expire each minute, for example. A set of one or more private location hash values (or other secure location indicators) is generated at block 354 in accordance with the method 200, for example. The set of private location hash values is provided to a server at block 356. The identifier of the portable device (e.g., phone number, IP address, serial number) and/or of the user operating the portable device (e.g., name, login for a certain electronic service) can be provided to the server as well. Next, at block 358, zero, one, or several identifiers of physically proximate device are received. The received identifiers, if available, are processed at block 360. As one example, a pop-up window is displayed on the screen of the portable device for each received identifier. The timer is then restarted at block 362, and the flow returns to block 352 upon expiration of the timer. However, in some implementations, the user also can disable the timer completely or adjust the expiration time of the timer (e.g., from the default value of one minute to three minutes).

Figure 7:
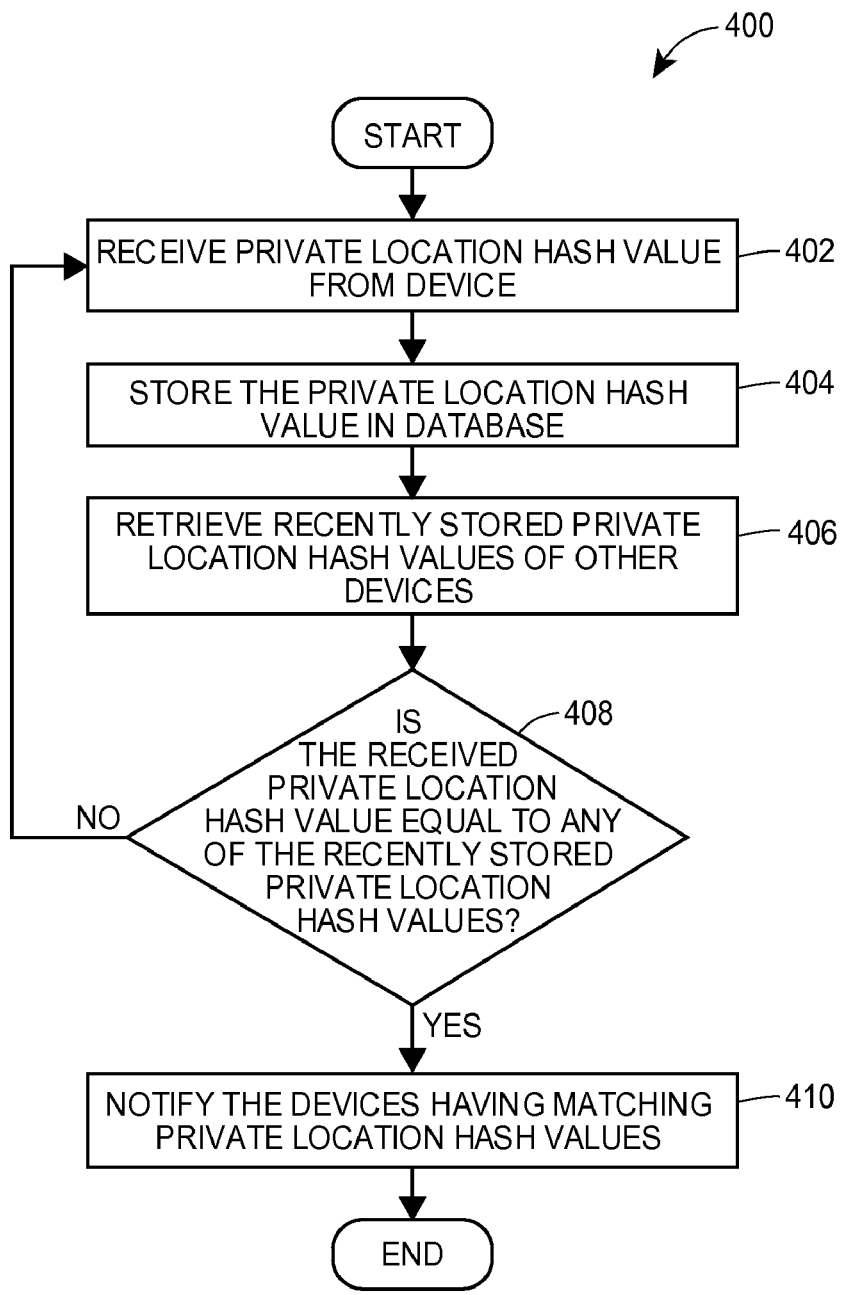
FIG. 7 is a flow diagram of an example method for identifying nearby users using private location has values received from the corresponding user devices, that can be implemented in a server of FIG. 1.

FIG. 7 depicts a flow diagram of an example method 400 which the server 16 of FIG. 1, for example, can implement to identify users that are physically proximate to each other using private location hash values. For example, the method 400 can be implemented partially in the secure location indicator matching module 70 and partially in the notification module 72. In another embodiment of a suitable communication system, the method 400 is implemented in several servers in a distributed manner. In yet another embodiment, the method 400 is implemented as an application that executes on a portable device. In other words, a certain portable device can be configured to operate as a server that receives and processes secure location indicators, if desired. Moreover, the same portable device can also operate as a participating device that generates and submits own secure location indicators.

Referring to FIG. 7, a private location hash value (or another secure location indicator) is received from a certain device at block 402. The received private location hash value is stored in a memory, such as a database, at block 404. One or more private location hash values previously received from other devices are retrieved from the memory at block 406. According to one implementation, all previously received private location hash values are "fresh," i.e., no longer than X minutes old. For example, X may be set to five minutes to ensure that a private location hash value received from a portable device is not compares against stale values that are no longer accurate. Further, in some implementations, the previously received private location hash values were received within the same minute to enforce a more strict expiration policy.

At block 408, the private location hash value received at block 402 is compared to the one or more private location hash values retrieved at block 406. If a match is detected, the flow proceeds to block 410, where an appropriate notification is generated and forwarded to the relevant devices. The notification may depend on user-specification settings. Alternatively, the notification may be forwarded to all relevant devices unconditionally, and an application executing on each device checks the user's settings to determine whether the notification should be displayed. If no match is detected at block 408, the flow returns to block 402 to receive a new private location hash value.

Figure 8:
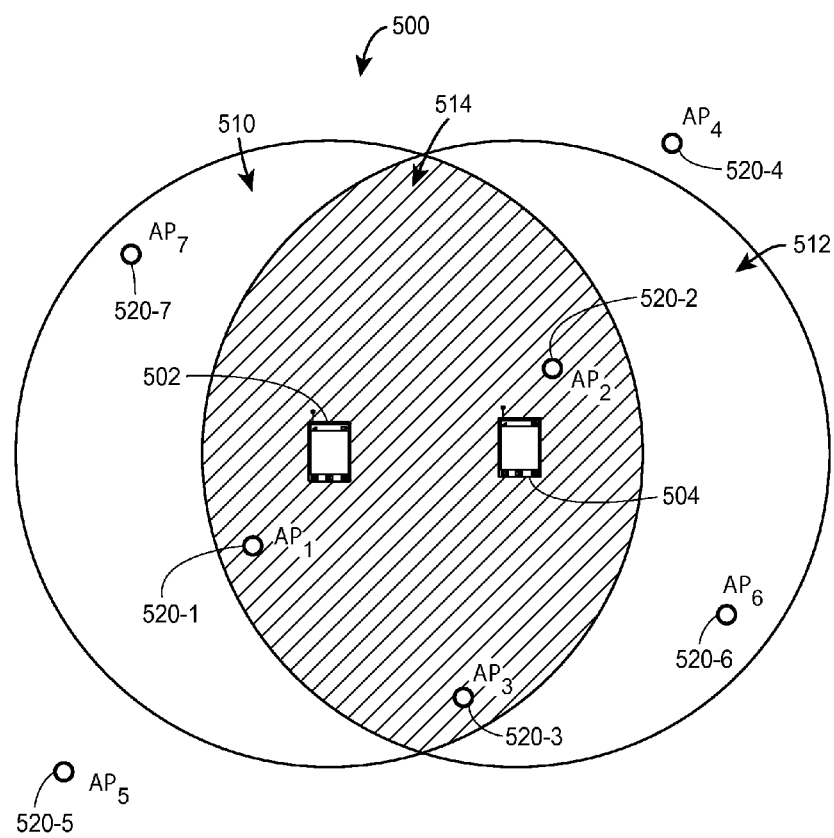
FIG. 8 is a diagram of an example scenario in which two portable devices receive several shared signals from the environment.

To further illustrate the techniques of the present disclosure, FIG. 8 depicts an example scenario in a system 500 in which portable devices 502 and 504 receive several shared signals from the environment. In particular, the portable device 502 can detect signals transmitted from within area 510, and the portable device 504 can detect signals transmitted from within area 512. The overlap between the areas 510 and 512 is depicted as an area 514. For simplicity, all APs 520 are assumed to transmit signals at the same power level. The portable device 502 can detect signals from APs 520-1, 520-2, 520-3, and 520-7, while the portable device 504 can detect signals from APs 520-1, 520-2, and 530-3, and 520-6. Neither the portable device 502 nor the portable device 504 can detect signals from APs 520-4 or 520-5.

Each of the portable devices 502 and 504 may implement the techniques discussed above to receive Wi-Fi data packets during a certain period of time, such as one minute, and generate a set of OTPs to achieve the effect of consistent hashing. For example, during a certain minute, the portable devices 502 and 504 may see a 50% overlap in the Wi-Fi data packets. Thus, if a certain hash function is applied to these data packets, there is a 50% probability that the portable devices 502 and 504 will generate the same hash value, to be used as an OTP. However, if L hash functions are used in the same scenario, the probability P that at least one of the hash values generated by the portable devices 502 and 504 will be the same becomes $$P = 1 - \frac{1}{2^L}$$

Thus, if L=7, there is a 99% probability that the portable devices 502 and 504 will generate an identical OTP. Further, if the portable devices 502 and 504 continue to see a 50% overlap in Wi-Fi packets during some time, and the portable devices 502 and 504 fail to generate the same OTP during the first minute, there is a 99% probability that the portable devices 502 and 504 generate the same OTP during the next minute. In short, by using multiple hash functions to hash Wi-Fi packets, portable devices can improve the probability of using the same OTP to generate a secure location indicator.

Figure 9A:
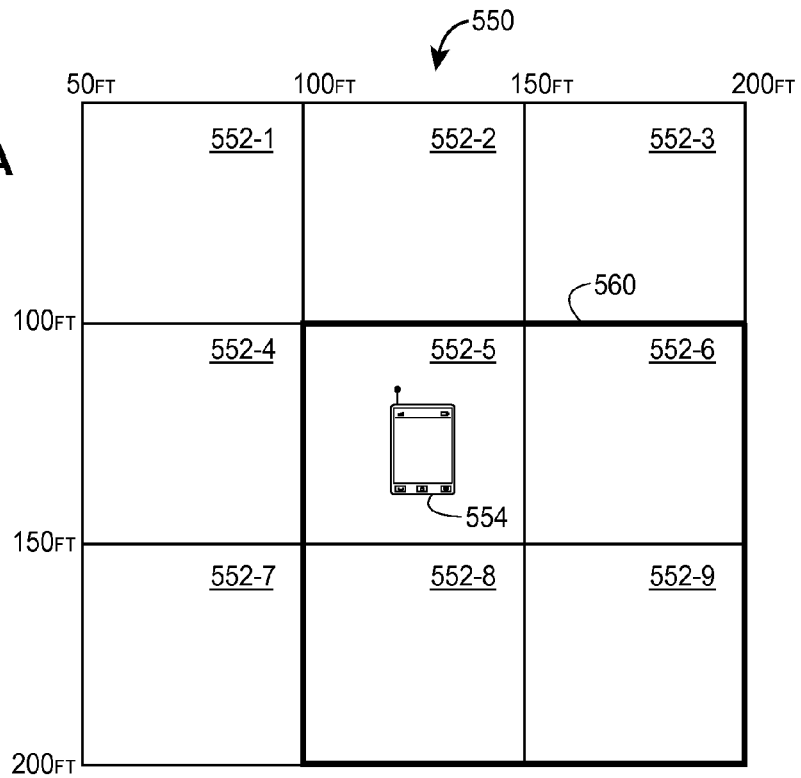
FIG. 9A is a diagram of a portable device situated relative to a certain set of quantized location cells and identifying its location as a sub-set of the quantized location cells.

To consider another factor in generating secure location indicators using the techniques described above, FIGS. 9A and 9B illustrate an example square area 550 that is 150 feet wide, in which a portable devices can indicate its location using quantized representations of its geographic coordinates. The area 550 can be represented as nine adjacent square regions, or cells 552-1, 552-2, . . . 552-9, each being 50 feet wide. Referring first to FIG. 9A, a portable device 554 may determine its geographic coordinates that correspond to certain latitude and longitude within the cell 552-5. The portable device 554 can quantize the latitude and longitude to generate four location identifiers corresponding to the cell 552-5, 552-6, 552-8, and 552-9. Thus, in order for another portable device to generate the same location indicator as the portable device 554, the other portable device must generate a location descriptor corresponding to one of the cells 552-5, 552-6, 552-8, and 552-9.

Figure 9B:
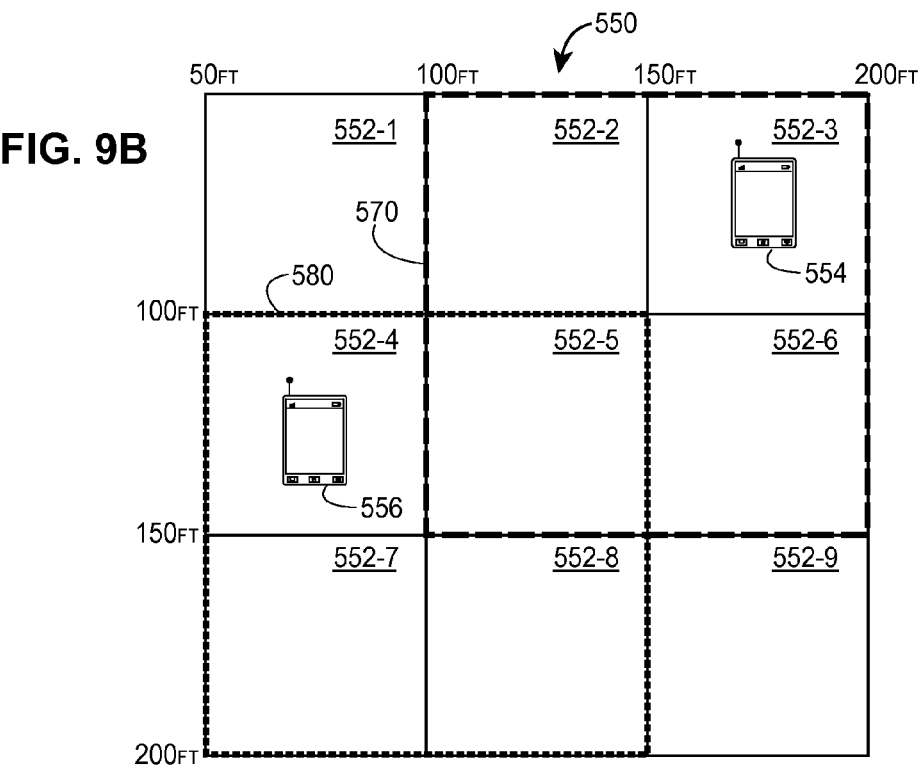
FIG. 9B is a diagram of an example scenario in which two portable devices share a quantized location cell.

FIG. 9B illustrates an example scenario in which two portable devices share a quantized location cell. In this case, the portable device 554 moves to the cell 552-3 and generates location indicators for the cells 552-2, 552-3, 552-5, and 552-6. A portable device 556 is in a cell 552-4 and generates location indicators for the cells 552-4, 552-5, 552-7, and 552-8. The portable devices 554 and 556 thus generate an identical location indicator that identifies the cell 552-5, although these devices are at least 50 feet apart. As discussed above with reference to FIG. 8, if the portable devices 554 and 556 observe a 50% overlap in the Wi-Fi packets, and if these devices implement seven hash functions to generate a set of OTPs, there is a 99% probability that these devices will also generate the same OTP within a certain time interval. Thus, using the same OTP and the same location descriptor that identifies the cell 552-5, the portable devices 554 and 556 can quickly locate each other with high probability.

With respect to accuracy, it is noted that the probability of two hash values colliding is $$\frac{1}{2^M},$$

where M is the number of bits in a secure hash value. Thus, if seven hash function are used along with four location descriptors to generate 28 hash values 128 bits long, and one billion users generate secure location hash values during a particular period, the probability of accidental collision of two secure location indicators (i.e., the probability of two devices that are far away from each other generating the same secure location indicator) is approximately one in a billion billion.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for generating secure location indicators through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method in a portable device operating in a wireless communication network for securely reporting an indication of a current geographic location of the portable device to a server without revealing the current geographic location of the portable device to the server, wherein the server is communicatively coupled to the communication network, the method comprising:
   generating a pseudo-random value using a signal from an environment in which the portable device operates;
   generating a location descriptor based on the current geographic location of the portable device;
   applying a cryptographic function to a combination of the pseudo-random value and the location descriptor to generate a secure location indicator for the portable device; and
   causing the secure location indicator to be electronically transmitted to the server via the communication network.

2. The method of claim 1, wherein the portable device is a first portable device, the method further comprising:
   in response to causing the secure location indicator to be electronically transmitted to the server, receiving, from the server, an indication that a second portable device is physically proximate to the first portable device.

3. The method of claim 1, further comprising providing an identifier of the portable device to be electronically transmitted to the server along with the secure location indicator.

4. The method of claim 1, wherein generating the pseudo-random value includes:
   receiving a data packet at the portable device,
   cryptographically hashing the data packet to generate a one-time pad (OTP), and
   using the generated OTP as the pseudo-random value.

5. The method of claim 1, wherein generating the pseudo-random value using the signal from an environment includes:
   receiving a plurality of data packets;
   cryptographically hashing each of the plurality of data packets to generate a plurality of OTPs; and
   selecting the pseudo-random value from the plurality of OTPs according to a predetermined criterion.

6. The method of claim 5, wherein the plurality of data packets conforms to an 802.11 wireless communication protocol.

7. The method of claim 5, wherein the selecting the pseudo-random value from the plurality of OTPs according to the predetermined criterion includes selecting a largest value.

8. The method of claim 1, wherein generating the location descriptor includes:
   determining a latitude and a longitude of the portable device, and
   quantizing the latitude and the longitude to generate the location descriptor.

9. The method of claim 1, wherein the pseudo-random value is a first pseudo-random value, the cryptographic function is a cryptographic hash function, the location descriptor is a first location descriptor, and the secure location indicator is a first secure location indicator, the method further comprising:
   generating a plurality of distinct pseudo-random values, including the first pseudo-random value, using the signal from the environment;
   generating a plurality of location descriptors, including the first location descriptor, based on the current geographic location of the portable device;

applying the cryptographic hash function to every combination of one of the plurality of distinct pseudo-random values and one of the plurality of location descriptors to generate a plurality of secure location indicators including the secure location indicator; and causing the plurality of secure location indicators to be electronically transmitted to the server via the communication network.

10. The method of claim 1, further comprising receiving an acoustic signal at the portable device, wherein the pseudo-random value is generated based on an acoustic signal received at the portable device.

11. The method of claim 1, further comprising periodically repeating each of the acts of (i) generating the pseudo-random value, (ii) generating the location descriptor, (iii) applying the cryptographic function to the combination of the pseudo-random value and the location descriptor, and (iv) causing the secure location indicator to be electronically transmitted to the server.

12. A method in a portable device operating in a wireless communication network for securely reporting an indication of a current geographic location of the portable device to a server without revealing the current geographic location of the portable device to the server, wherein the server is communicatively coupled to the communication network, the method comprising:

deriving a plurality of one-time pads (OTPs) from environmental entropy;

determining the current geographic location of the portable device;

generating a plurality of location descriptors based on the current geographic location of the portable device, wherein each of the plurality of location descriptors specifies a respective geographic area encompassing, or being proximate to, the current geographic location of the portable device;

hashing every combination of one of the plurality of OTPs with one of the plurality of location descriptors to generate a plurality of secure location indicators; and providing the plurality of secure location indicators and an identifier of the portable device to the server via the communication network.

13. The method of claim 12, wherein the portable device is a first portable device, the method further comprising:

in response to providing the plurality of secure location indicators to the server, receiving, from the server, an indication that a second portable device is physically proximate to the first portable device, wherein the second portable device generated a secure location indicator identical to one of the plurality of secure location indicators.

14. The method of claim 12, wherein deriving the plurality of OTPs includes:

receiving a plurality of data packets from a set of one or several wireless access points operating in a vicinity of the portable device, during a period of fixed duration, applying a multiplicity of cryptographic hash functions to each of the plurality of data packets to generate a multiplicity of streams of pseudo-random values, and selecting a respective pseudo-random value from each of the multiplicity of streams of pseudo-random values to generate the plurality of OTPs.

15. The method of claim 12, wherein determining the current geographic location of the portable device includes receiving a set of signals associated with Global Positioning Service (GPS).

16. The method of claim 12, wherein determining the current geographic location of the portable device includes triangulating a position of the portable device using a plurality of signals received from respective wireless access points.

17. The method of claim 12, wherein generating the plurality of location descriptors includes:

determining a latitude and a longitude of the portable device;

quantizing the latitude and the longitude to generate the plurality of location descriptors, wherein each of the plurality of location descriptors specifies a respective square area.

18. A portable device comprising:

one or more processors;

a communication module coupled to the one or more processors and configured to transmit and receive signals via a wireless communication network;

a computer-readable memory coupled to the one or more processors and storing instructions thereon that, when executed by the one or more processors, cause the portable device to:

generate a set of one or more one-time pads (OTPs) using a signal from an environment in which the portable device operates, wherein the signal is received via the communication module;

generate a set of one or more location descriptors based on a current geographic location of the portable device, wherein each location descriptor specifies a geographic area associated with the current geographic location of the portable device;

generate a set one of one or more secure location indicators using a cryptographic function, the set of OTPs, and the set of location descriptors;

provide the set of secure location indicators via the communication module to a server operating on the wireless communication network for determining one or more devices physically proximate to the portable device using the plurality of secure location descriptors.

19. The portable device of claim 18, where the set of OTPs includes a plurality of OTPs, the set of location descriptors includes a plurality of location descriptors, and the set of secure location descriptors includes a plurality of secure location descriptors; wherein to generate the plurality of secure location descriptors, the instructions cause the portable device to:

generate a plurality of combinations, each combination including one of the plurality of OTPs and one of the plurality of location descriptors, and apply the cryptographic function to each of the plurality of combinations to generate the plurality of secure location descriptors.

20. The portable device of claim 19, wherein the set of location descriptors includes a plurality of location descriptors, and wherein to generate the plurality of location descriptors, the instructions cause the portable device to:

determine a latitude and a longitude corresponding to the current geographic location of the portable device, and quantize the latitude and the longitude to generate the plurality of location descriptors, each including a respective approximation of the latitude and a respective approximation of the longitude.

21. The portable device of claim 20, further comprising a positioning module configured to determine the current geographic location of the portable device.

22. The portable device of claim 21, wherein the positioning module determines the current geographic location of the portable device based on a plurality of Global Positioning Service (GPS) signals.

23. The portable device of claim 18, wherein the communication module is configured to:
receive a plurality of beacons from respective wireless access points;
determine the current geographic location of the portable device based on the plurality of beacons.

24. The portable device of claim 18, wherein the set of OTPs includes a plurality of OTPs, and wherein to generate the plurality of OTPs, the instructions cause the portable device to:
receive a plurality of data packets included in the received signal,
apply a plurality of cryptographic hash functions to the plurality of data packets to generate a plurality of streams of pseudo-random values, and
select a one pseudo-random value from each of the multiplicity of streams of pseudo-random values to generate the plurality of OTPs.

25. A method in a server communicatively coupled to a wireless communication network in which a first portable device and a second portable device operate, the method comprising:
electronically receiving, at the server, a first secure location indicator from the first portable computing device, wherein the first secure location indicator was generated using a cryptographic function applied to a combination of a first pseudo-random value and a first location descriptor, wherein the first pseudo-random value is generated using a signal in an environment in which the first portable computing device operates, wherein the first location descriptor indicates a location of the first portable computing device, and wherein the first secure location indicator does not reveal the location of the first portable computing device to the server;
electronically receiving, at the server, a second secure location indicator from the second portable computing device, wherein the second secure location indicator was generated using the cryptographic function applied to a combination of a second pseudo-random value and a second location descriptor, wherein the second pseudo-random value is generated using a signal in an environment in which the second portable computing device operates, wherein the second location descriptor indicates a location of the second portable computing device, and wherein the second secure location indicator does not reveal the location of the second portable computing device to the server;
comparing the first secure location indicator to the second secure location indicator; and
in response to determining that the first secure location indicator is identical to the second secure location indicator, causing an indication of physical proximity of the second portable computing device to be electronically transmitted to the first portable computing device.

26. The method of claim 25, wherein the server is communicatively coupled to an electronic database, the method further comprising:
electronically receiving an identifier of the first portable computing device with the first secure location indicator;
generating a first record in the electronic database, wherein the first record includes the identifier of the first portable computing device and the first secure location indicator;
electronically receiving an identifier of the second portable computing device with the second secure location indicator; and
generating a second record in the electronic database, wherein the second record includes the identifier of the second portable computing device and the second secure location indicator.

27. The method of claim 25, further comprising:
electronically receiving, at the server, a first plurality of distinct secure location indicators including the first secure location indicator from the first portable device;
electronically receiving, at the server, a second plurality of distinct secure location indicators including the second secure location indicator from the second portable device; and
comparing the first plurality of distinct secure location indicators to the second plurality of distinct secure location indicators.

28. The method of claim 27, further comprising receiving secure location indicators from each of the first portable device and the second portable device during each of a plurality of time periods of a fixed duration, wherein the first plurality of secure location indicators is received during a first one of the plurality of time periods, and wherein the second plurality of secure location indicators is received during a second one of the plurality of time periods.

29. The method of claim 25, wherein each of the first secure location indicator and the second secure location indicator is generated using the cryptographic function and a public key associated with the cryptographic function, wherein a private key associated with the cryptographic function is unavailable at the server.

30. The method of claim 25, wherein operate the signal used to generate the first pseudo-random value is the signal used to generate the second pseudo-random value.

* * * * *